United States Patent
Kim et al.

(10) Patent No.: US 10,008,705 B2
(45) Date of Patent: Jun. 26, 2018

(54) SEPARATOR FOR SECONDARY BATTERY AND METHOD OF MANUFACTURING THE SAME

(71) Applicant: LG ELECTRONICS INC., Seoul (KR)

(72) Inventors: Yong Ho Kim, Seoul (KR); Doo Hwan Myung, Seoul (KR); Geun Ho Choi, Seoul (KR); Ho June Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 14/783,343

(22) PCT Filed: Apr. 7, 2014

(86) PCT No.: PCT/KR2014/002990
§ 371 (c)(1),
(2) Date: Oct. 8, 2015

(87) PCT Pub. No.: WO2014/168392
PCT Pub. Date: Oct. 16, 2014

(65) Prior Publication Data
US 2016/0072111 A1 Mar. 10, 2016

(30) Foreign Application Priority Data

Apr. 9, 2013 (KR) .......... 10-2013-0038783
Oct. 18, 2013 (KR) .......... 10-2013-0124653

(51) Int. Cl.
*H01M 2/16* (2006.01)
*H01M 2/14* (2006.01)

(52) U.S. Cl.
CPC ......... *H01M 2/1686* (2013.01); *H01M 2/145* (2013.01); *H01M 2/166* (2013.01); *H01M 2/1646* (2013.01)

(58) Field of Classification Search
None
See application file for complete search history.

(56) References Cited

U.S. PATENT DOCUMENTS

| 5,989,750 A | 11/1999 | Ohba et al. |
| 2003/0022068 A1 | 1/2003 | Pekala |
| 2012/0171810 A1 | 7/2012 | Park et al. |

FOREIGN PATENT DOCUMENTS

| CN | 1178395 A | 4/1998 |
| CN | 1524303 A | 8/2004 |
| CN | 101281961 A | 10/2008 |
| CN | 102064300 A | 5/2011 |
| CN | 102568645 A | 7/2012 |
| CN | 102686684 A | 9/2012 |

(Continued)

OTHER PUBLICATIONS

Machine translation of KR 1020130021079, Mar. 2013.*

*Primary Examiner* — Jonathan Crepeau
(74) *Attorney, Agent, or Firm* — Birch, Stewart, Kolasch & Birch, LLP (57) ABSTRACT

A separator for secondary batteries is disclosed. The separator includes a separator main body and a coating layer disposed on the separator main body and including a first particle having a first melting point and a second particle having a second melting point that is higher than the first melting point.

15 Claims, 5 Drawing Sheets

(56) References Cited

FOREIGN PATENT DOCUMENTS

| KR | 10-0982451 B1 | 9/2010 |
| KR | 10-1021085 B1 | 3/2011 |
| KR | 10-2012-0070976 A | 7/2012 |
| KR | 10-2012-0078109 A | 7/2012 |
| KR | 10-2013-0021079 A | 3/2013 |

* cited by examiner

SEPARATOR FOR SECONDARY BATTERY AND METHOD OF MANUFACTURING THE SAME

TECHNICAL FIELD

Embodiments relate to a separator for secondary batteries and a method of manufacturing the same, and more particularly to a separator for secondary batteries that is disposed between a cathode and an anode of a secondary battery and a method of manufacturing the same.

BACKGROUND ART

Batteries having various structures and types are used according to use of various electronic devices. Among these, a secondary battery includes an anode and cathode disposed in an electrolyte and a separator disposed between the anode and the cathode. Separators prevent electrical short circuit by separating anodes from cathodes and allow electrolytes and ions to pass therethrough.

Conventionally used separators formed of polyethylene or the like have poor heat resistance and thus may be damaged when an internal temperature of secondary batteries increases. Accordingly, short circuit between a cathode and an anode may occur and, consequently, stability of secondary batteries may not be maintained. In addition, such separators have poor affinity with electrolytes, thus having low wettability and, accordingly, there are limitations in increasing capacities of secondary batteries.

DISCLOSURE OF INVENTION

Technical Problem

Embodiments provide a separator for secondary batteries that may enhance stability and capacity of secondary batteries and a method of manufacturing the same.

Solution to Problem

In one embodiment, a separator for secondary batteries includes a separator main body and a coating layer disposed on the separator main body and including a first particle having a first melting point and a second particle having a second melting point that is higher than the first melting point.

The first particle may include at least one of a first glass frit and a resin, and the second particle may include at least one of a second glass frit that is different from the first glass frit, an oxide, and a carbide.

The resin of the first particle may include at least one of polyethylene (PE), polypropylene (PP), polymethylmethacrylate (PMMA), epoxy resin, and urethane resin.

The oxide and carbide of the second particle may include at least one of $Al_2O_3$, $SiO_2$, $ZrO_2$, $BaTiO_3$, $MgO$, $TiO_2$, $SiC$, and $ZrSi_4O$.

The first melting point of the first particle may be 80° C. to 260° C., and the second melting point of the second particle may be 400° C. or greater.

The first melting point of the first particle may be 80° C. to 200° C., and the second melting point of the second particle may be 500° C. to 600° C.

The first glass frit may include a network modifier.

When the first particle includes the first glass frit and the second particle includes the second glass frit, the first glass frit may include a larger amount of a network modifier than the second glass frit.

The first glass frit may include 35 to 50 parts by weight of a network modifier based on 100 parts by weight of the first glass frit.

The second glass frit may include 20 parts by weight or less of a network modifier based on 100 parts by weight of the second glass frit.

The network modifier may include an oxide including at least one of sodium (Na), calcium (Ca), barium (Ba), vanadium (V), bismuth (Bi), and lead (Pb).

When a total amount of the first and second particles is 100 parts by weight, amounts of the first and second particles may be 10 to 50 parts by weight and 50 to 90 parts by weight, respectively.

The first particles or the second particles may have a median particle size of 0.5 µm to 1.5 µm.

A pore formed in the separator may have a size of 10 nm to 1000 nm.

The coating layer may have a thickness of 1 µm to 100 µm.

The coating layer may have a thickness of 5 µm to 10 µm.

The coating layer may further include a polymer binder.

In another embodiment, a method of manufacturing a separator for secondary batteries includes preparing a separator main body, forming a coating material by mixing a solvent, a polymer binder, a first particle having a first melting point, and a second particle having a second melting point that is higher than the first melting point, and forming a coating layer by coating the coating material on the separator main body and heat-treating the coated separator.

The forming of the coating material may be performed through physical mixing.

Amounts of the solvent, the polymer binder, the first particle, and the second particle may be 50 to 90 parts by weight, 1 to 25 parts by weight, 5 to 20 parts by weight, and 5 to 20 parts by weight, respectively, based on 100 parts by weight of the coating material.

The separator for secondary batteries includes the coating layer including the first and second particles having different melting points (softening temperatures) and thus, when an internal temperature of a secondary battery increases, the first particles are softened to close pores of the separator main body and the second particles are not softened and thus the shape of the separator is maintained. That is, when the temperature of a secondary battery is a critical temperature or higher, the pores of the separator are closed and thus operation of the secondary battery is stopped, which may prevent occurrence of additional problems. Accordingly, thermal and mechanical stability of the separator may be enhanced and secondary battery performance may be enhanced.

In addition, interparticle gaps of the first and second particles act as micropores and thus pore sizes may be uniform. Accordingly, a space for storage of an electrolyte may be increased and the storage may be maintained by the polymer binder. Thus, impregnation properties of the electrolyte are enhanced, which results in enhanced characteristics of the secondary battery. In addition, the coating layer has superior affinity with the electrolyte than the separator main body and thus wettability of the electrolyte is enhanced and, accordingly, capacity of the secondary battery may be increased.

BEST MODE FOR CARRYING OUT THE INVENTION

Reference will now be made in detail to embodiments, examples of which are illustrated in the accompanying drawings. However, the present disclosure may be embodied in many different forms and should not be construed as limited to the embodiments set forth herein.

Only elements constituting essential features of the present invention are illustrated in the accompanying drawings and other non-essential elements that will not be described herein are omitted from the drawings, for clarity of description. Like reference numerals refer to like elements throughout. In the drawings, the thicknesses, areas, etc. of constituent elements may be exaggerated or reduced for clarity and convenience of illustration. The present invention is not limited to the illustrated thicknesses, areas, etc.

It will be further understood that, throughout this specification, when one element is referred to as "comprising" another element, the term "comprising" specifies the presence of another element but does not preclude the presence of other additional elements, unless context clearly indicates otherwise. In addition, it will be understood that when one element such as a layer, a film, a region or a plate is referred to as being "on" another element, the one element may be directly on the another element, and one or more intervening elements may also be present. In contrast, when one element such as a layer, a film, a region or a plate is referred to as being "directly on" another element, no intervening elements are present.

Hereinafter, a separator for secondary batteries according to an embodiment of the present invention and a method of manufacturing the same will be described in detail with reference to the accompanying drawings.

Figure 1A:
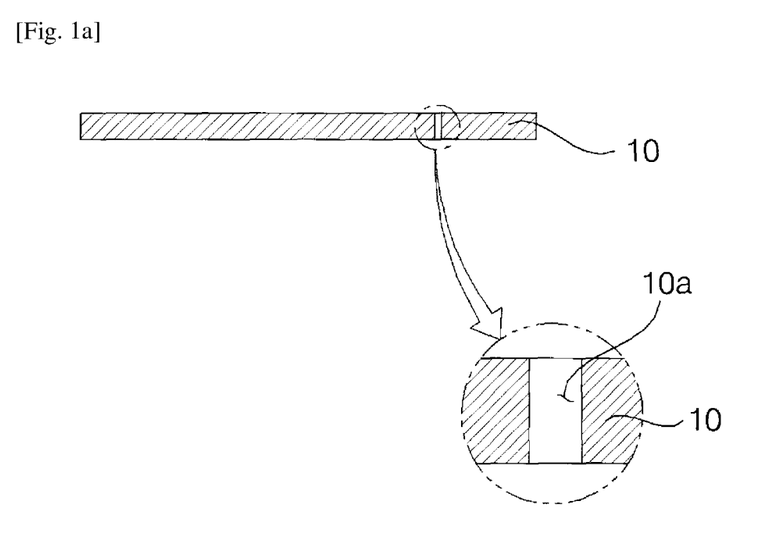
FIGS. 1a and 1b are sectional views illustrating a method of manufacturing a separator for secondary batteries according to an embodiment of the present invention.
Figure 1B:
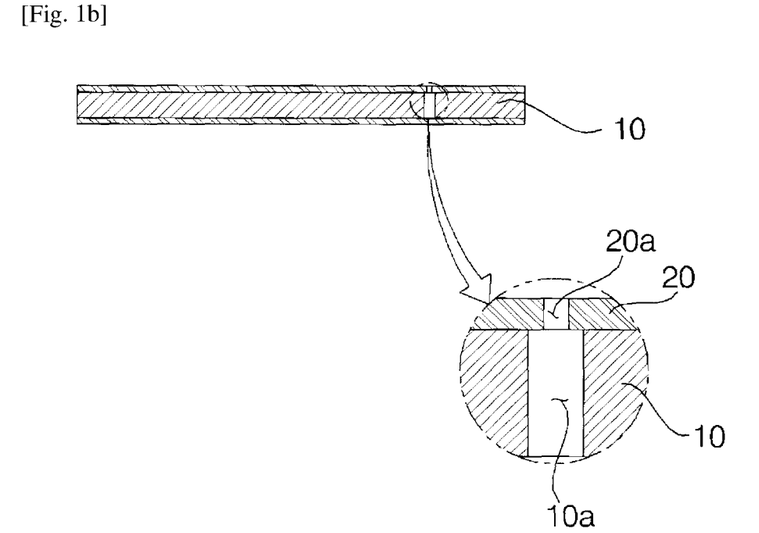

FIGS. 1a and 1b are sectional views illustrating a method of manufacturing a separator for secondary batteries according to an embodiment of the present invention.

First, as illustrated in FIG. 1a, a separator main body 10 is prepared.

In this regard, the separator main body 10 may be a microporous sheet or film formed of a polyolefin-based material such as polyethylene, polypropylene, or the like, a non-woven-based material, or the like. However, the disclosure is not limited to the above examples and the separator main body 10 may include various other materials.

The separator main body 10 has a plurality of pores 10a so as to have microporosity. For example, the pores 10a may have a size (e.g., a particle diameter) of 10 nm to 1000 nm. When the size of the pores 10a is less than 10 nm, ion permeability of a separator 100 (see FIG. 1B) decreases and thus a movement rate of ions decreases when ions migrate between a cathode and an anode and, accordingly, performance of a secondary battery may be reduced. On the other hand, when the size of the pores 10a exceeds 1000 nm, physical characteristics of the separator main body 10 may be deteriorated due to the excessive pore size and self-discharge of a secondary battery may occur when the secondary battery is applied. However, the disclosure is not limited to the above examples and the size of the pores 10a of the separator main body 10 may have various other values.

For example, the separator main body 10 may have a thickness of 5 μm to 30 μm. When the thickness of the separator main body 10 is less than 5 μm, physical characteristics of the separator 100 may be deteriorated. Thus, the separator 100 may be torn when impurities such as dead lithium, lithium dendrite, or the like are formed in a secondary battery and, accordingly, contact between a cathode and an anode occurs, which may lead to explosion. On the other hand, when the thickness of the separator main body 10 exceeds 30 μm, the thickness of the separator 100 may increase. In particular, in the present embodiment, a coating layer 20 is formed on at least a surface of the separator main body 10 and thus the thickness of the separator 100 is much larger than in the related art. Thus, the thickness of the separator 100 may be adjusted considering this. When the thickness of the separator 100 increases, the volume of the separator 100 in a secondary battery increases and thus the capacity of the secondary battery may decrease. However, the disclosure is not limited to the above examples and the thickness of the separator main body 10 may have various other values.

Subsequently, as illustrated in FIG. 1B, the coating layer 20 is formed by preparing a coating material, coating a surface or opposite surfaces of the separator main body 10 with the coating material, and heat-treating the resulting structure. For example, in the present embodiment, the coating layer 20 is disposed on opposite surfaces of the separator main body 10. Thereby, manufacture of the separator 100 is completed.

In this regard, the coating material may be a mixed slurry prepared by physically mixing a first particle (first particles), a second particle (second particles), and a polymer binder. Here, the first and second particles have different melting points (softening temperature when the first and/or second particles include glass frit). This will be described below in more detail.

A solvent serves to disperse the first and second particles and the polymer binder. Examples of the solvent include, without being limited to, acetone, tetrahydrofuran (THF), N-methyl-pyrrolidone (NMP), dimethyl formamide (DMF), methyl ethyl ketone (MEK), water, and mixtures thereof. The polymer binder serves to enhance dispersibility of the first and second particles and to enhance adhesion between the separator main body 10 and the first and second particles of the coating material during coating. The polymer binder may, for example, be polyvinylidenefluoride hexafluoropropylene (PVDF-HFP), polyimide (PI), polymethyl methacrylate (PMMA), polyacrylonitrile (PAN), polyethylene oxide (PEO), polymethyl methacrylate (PMMA)-co-polyacrylonitrile (PAN) copolymer, carboxymethyl cellulose (CMC), styrene butadiene rubber (SBR), or a mixture thereof. However, types of the solvent and the polymer binder are not limited and various other solvents, polymer binders, and the like may be used.

In this regard, as the polymer binder, a material that is readily dissolved in the solvent may be used. That is, when the polymer binder includes polymethyl methacrylate, acetone or the like may be used as a solvent capable of dissolving the material. In addition, when the polymer binder includes CMC, SBR, or the like, water may be used as a solvent capable of dissolving this material. In addition, various combinations of solvents and polymer binders may be used.

The first and second particles are coated on the surface of the separator main body 10, thus serving to enhance electrolyte absorptivity, mechanical characteristics, and thermal characteristics. In addition, the first particles have a relatively low first melting point and the second particles have a relatively high second melting point. Thus, when the internal temperature of the secondary battery is between the first and second melting points, the first particles are melted or softened and thus shut down the pores 10a of the separator main body 10, and the second particles are not melted and softened and maintain melt integrity of the separator 100. This will be described below in further detail.

The first and second particles may include various materials, and various configurations for making softening temperatures of the first and second particles different may be applied.

For example, the first particles may include a first glass frit, a resin, or the like, and the second particles may include a second glass frit that is different from the first glass frit, an oxide, a carbide, or the like. In this regard, the first melting point of the first particle may be 80° C. to 260° C. (more particularly, 80° C. to 200° C.), and the second melting point of the second particle may be 400° C. or higher (more particularly, 500° C. to 600° C.). The first and second glass frits that may be used as the first and second particles, respectively will be first described and thereafter the resin that may be used as the first particle and the oxide, carbide or the like that may be used as the second glass frit will be described in more detail.

The first and second frits may be formed through mixing of plural ceramic materials (e.g., oxide, fluoride, nitride, sulfide and phosphate based materials) in consideration of characteristics such as electrical conductivity, adhesion, coefficient of thermal expansion, softening temperature, and the like. The ceramic materials of the first and second glass frits may be combined with each other so as to have a network structure. Each ceramic material has fixed physical properties and thus adjustment and customization of various characteristics are achieved by mixing of the plural ceramic materials. In this regard, the ceramic materials require chemical and electrical/chemical stability, no reactivity or low reactivity with an organic solvent, a salt, or the like used as an electrolyte of a secondary battery, and environmental stability, in particular stability at high temperature. As described above, the first and second glass frits may include different amounts of ceramic materials so as to have different melting points (softening temperatures).

The first and second glass frits have a random oxygen polyhedral network structure. In this regard, the first and second glass frits include a network former and may include a network modifier, an intermediate material, or the like.

The network former is a ceramic material (e.g., an oxide, fluoride, nitride, sulfide or phosphate based material) including silicon (Si), boron (B), phosphorus (P), arsenic (As), beryllium (Be), or the like and serves to form a network structure and an oxygen polyhedron. The network modifier is a ceramic material (e.g., an oxide, fluoride, nitride, sulfide or phosphate based material, in particular an oxide) including sodium (Na), calcium (Ca), barium (Ba), vanadium (V), bismuth (Bi), lead (Pb), or the like and serves to reduce a melting point (softening temperature) by cleavage of the network structure. In addition, the intermediate material is a ceramic material (e.g., an oxide, fluoride, nitride, sulfide or phosphate based material) including aluminum (Al), magnesium (Mg), zinc (Zn), niobium (Nb), or the like and serves as a network former or a network modifier in some cases but cannot independently form glass frit. In addition, the first and/or second glass frits may further include a material such as lithium (Li), Be, or the like.

Among the materials described above, when the amount of the network modifier increases, the network structure is cleaved and, accordingly, a melting point (softening temperature) decreases. Thus, the first glass frit may have a relatively low melting point by inclusion of a relatively large amount of the network modifier and the second glass frit may have a relatively high melting point by inclusion of a relatively small amount of the network modifier or by exclusion of the network modifier.

As described above, the first glass frit may include a larger amount of the network modifier than the second glass frit. For example, the amount of the network modifier in the first glass frit may be 35 to 50 parts by weight based on 100 parts by weight of the first glass frit, and the amount of the network modifier in the second glass frit may be 20 parts by weight or less based on 100 parts by weight of the second glass frit or the network modifier may not be included in the second glass frit. The above-described ranges are intended for the first and second glass frits to have desired first and second melting points (softening temperatures). However, the amounts may vary according to material, composition, and the like of glass frit.

For example, the first melting point of the first glass frit may be 150° C. to 200° C., and the second melting point of the second glass frit may be 400° C. When the first melting point is beyond the above-described range, it may be difficult to prepare a desired first glass frit and other properties of the first glass frit may be deteriorated. In addition, when the second melting point of the second glass frit is less than 400° C., the second glass frit may be melted or softened at a temperature that is lower than a desired temperature.

In the present embodiment, the softening temperatures of the first and second glass frits are adjusted by varying the amount of the network modifier, but the disclosure is not limited thereto. That is, the softening temperatures of the first and second glass frits may be adjusted by varying type of the network modifier, or the like. In addition, as described below, the softening temperatures of the first and second glass frits may vary according to particle diameters of the first and second glass frits and thus the first glass frit may have a relatively low first softening temperature by decreasing the particle diameter of the first glass frit. In addition, various other methods may be applied.

In addition, when the first particles include the first glass frit, the second particles may include the second glass frit, an oxide, or a carbide. In addition, when the second particles include the second glass frit, the first particles may include the first glass frit or a resin. That is, the first and second glass frits may not necessarily be included together, and only one of the first and second glass frits may be included.

The resin that may be used as the first particles may include PE, PP, PMMA, epoxy region, urethane resin, or the like. For example, these resins may be powder-type resins. The first melting point of the resin may have a relatively low value, for example, 80° C. to 260° C. (more particularly, 80° C. to 200° C., for example, 100° C. to 150° C.), and thus, the resin is easily melted at the temperature within the above-described ranges and, consequently, may close the pores 10a of the separator main body 10. More particularly, when the resin constituting the first particles includes polyethylene, polypropylene, or polymethylmethacrylate, the first melting point may be 100° C. to 150° C. and the resin is melted at the temperature within the above-described ranges and thus present in a liquid or gel state. When the resin constituting the first particles includes epoxy resin or urethane resin, the first melting point may be 80° C. to 150° C. and the resin is melted at the temperature within the above-described ranges and thus may be present in a solid state. However, the disclosure is not limited to the above examples and type, melting point, state after melting and the like of the resin may be variously modified.

In this regard, when a resin is used as the first particles, the particle form of the first particles may be kept using a solvent that does not dissolve the resin. For example, a resin such as polyethylene, polypropylene, or the like is insoluble in acetone and thus acetone may be used as the solvent. However, acetone is not suitable for use as the solvent when epoxy resin is used as the first particles since epoxy resin is soluble in acetone. When epoxy resin is used as the first particles, water may be used as the solvent since epoxy resin is insoluble in water. In addition, when materials for forming the first particles and the polymer binder are identical, the first particles may be modified by a chemical method or the like so as to be insoluble in a solvent and thus may have different properties than those of the material used as the polymer binder. That is, even though the first particles and the polymer binder include the same material, the first particles may be insoluble in the corresponding solvent and the polymer binder may be soluble in the corresponding solvent.

The oxide or carbide that may be used as the second particles may include at least one of Al2O3, SiO2, ZrO2, BaTiO3, MgO, TiO2, SiC, and ZrSi4O. These materials are not readily melted at a temperature of 400° C. or higher. The oxide or carbide used as the second particles may be included so as to have a particle form or a physically bonded state. That is, the oxide or carbide used as the second particles is present in an independent particle state unlike oxides of glass frit that are chemically bonded to form a network structure.

The diameters of the first and second particles may be determined by considering softening characteristics, precipitation characteristics, and the like. That is, as the diameters of the first and second particles decrease, the first and second particles may be readily melted or softened at a low melting point (softening temperature). On the other hand, when the diameters of the first and second particles increase, packing density of the coating layer 20 decreases and thus characteristics of the separator 100 may be poor and it may be difficult to adjust the thickness of the separator 100. However, when the first and second particles are too small, agglomeration occurs and thus unnecessary precipitation and the like may occur. By considering this, a median particle diameter D50 (a particle diameter of 50% of the particles that has a greater particle diameter) of the first particles and a D50 of the second particles may be 0.5 μm to 1.5 μm. However, the disclosure is not limited to the above examples and the median particle diameter D50 of each of the first and second particles may have various other values.

The amounts (parts by weight) of the solvent, the first and second particles, and the polymer binder in the above-described coating material are as follows. The amounts of the solvent, the polymer binder, the first particle, and the second particle in the coating material may be 50 to 90 parts by weight, 1 to 25 parts by weight, 5 to 20 parts by weight, and 5 to 20 parts by weight, respectively, based on 100 parts by weight of the coating material. The solvent is included in an amount sufficient to disperse the polymer binder and glass frit, and the polymer binder is included in an amount not to close the pores 10a and to enhance dispersibility and adhesion. The first particles are included in an amount sufficient to be melted or softened at a desired temperature to close the pores 10a of the separator 100. The second particles are included in an amount not to be melted at a desired temperature so that the shape of the separator 100 is kept. However, the disclosure is not limited to the above examples and the amounts (parts by weight) of the solvent, the polymer binder, and the first and second particles may vary and the coating material may further include an additive and the like.

In this regard, the first particles may be included in the same or smaller amount than the second particles. This is intended to smoothly implement shape maintenance by the second particles. For example, when a sum of the amounts of the first and second particles is 100 parts by weight, the amount of the first particles may be 10 parts by weight to 50 parts by weight, and the amount of the second particles may be 50 parts by weight to 90 parts by weight. When the amount of the first particles is less than 10 parts by weight and the amount of the second particles exceeds 90 parts by weight, shut down may not smoothly occur at a critical temperature or higher. When the amount of the first particles exceeds 50 parts by weight and the amount of the second particles is less than 50 parts by weight, physical characteristics of the separator 100 may be deteriorated. However, the disclosure is not limited to the above examples and the first particles may be included in a larger amount than the second particles. As described above, the coating material may be formed by mixing the solvent, the polymer binder, and the first and second particles by physical mixing such as ball milling, mixing, or the like. As such, the first and second particles may maintain their intrinsic physical properties through mixing by a physical mixing method. After mixing, the diameter (e.g., a median particle diameter) of the first particles and the diameter (e.g., a median particle diameter) of the second particles may be 0.5 μm to 1.5 μm. These ranges are set in consideration of thickness, softening temperature and the like of the separator 100, but the disclosure is not limited thereto.

The coating material formed through mixing may be coated on the separator main body 10 and subjected to heat treatment, thereby forming the coating layer 20. Coating of the coating material on the separator main body 10 may be performed using various coating methods. For example, the coating material may be coated on opposite surfaces of the separator main body 10 by immersing the separator main body 10 into the coating material by a simplified manufacturing process, e.g., dip coating. In addition, various coating methods such as die coating, gravure coating, comma coating, and the like may be used. The heat treatment process may be performed at various temperatures for various periods of time that enable formation of the coating layer 20 by drying the coating material. For example, the heat treatment temperature may be 30° C. to 70° C., and the heat treatment time may be 1 minute to 30 minutes (e.g., 1 minute to 10 minutes). The heat treatment temperature and time are set in consideration of sufficient drying of the coating material and time and cost of the heat treatment process, but the disclosure is not limited thereto.

In the heat treatment process, the solvent (e.g., acetone or the like) is at least partially removed. Accordingly, the coating layer 20 includes a polymer material formed by drying of the solvent that has not yet been removed during heat treatment and polymer binders and the first and second particles. In this regard, the first and second particles are included in the coating layer 20 in a state of maintaining their intrinsic physical properties. In this regard, the first and second particles may be present in a particle form and the polymer material may be melted and thus present in the form of a film. Accordingly, the first and second particles and the polymer material may be observed with the naked eye, a microscope, or the like. The first and second particles, the polymer material, and the like may be detected by component analysis.

The thickness of each of the coating layers 20 may be 1 μm to 100 μm. When the thickness of the coating layer 20 is less than 1 μm, the thickness of the coating layer 20 is insufficient and thus it may be difficult to sufficiently exhibit effects by the coating layers 20. On the other hand, when the thickness of the coating layer 20 exceeds 100 μm, the pores 10a of the separator main body 10 may be closed and migration and the like of ions may be interfered with when the thickness of the coating layer 20 is unnecessarily large, or raw material costs may be increased. When further considering effects by the coating layers 20, raw material costs, and the like, the thickness of the coating layer 20 may be 5 μm to 10 μm.

As described above, since the first and second particles included in the coating layer 20 maintain their intrinsic properties, a portion of the coating layer 20 in which the first particles are positioned has a relatively low first melting point and a portion of the coating layer 30 in which the second particles are positioned has a relatively high second melting point. When the internal temperature of a secondary battery is between the first and second melting points, the first particles are melted or softened to close the pores 10a of the separator main body 10, and the second particles are softened or not softened and thus the shape of the separator 100 is maintained. That is, when the temperature of a secondary battery is a critical temperature or higher, the pores 10a of the separator main body 10 are closed and thus operation of the secondary battery is stopped, which may prevent occurrence of additional problems. Accordingly, thermal and mechanical stability of the separator 100 may be enhanced and secondary battery performance may be enhanced.

In this regard, the first melting point of the first particles may be little lower or similar to a critical temperature, which is a determinant of rapid temperature increase, and the second melting point of the second particles may be lower than a maximum temperature of a secondary battery. Thus, in the vicinity of the critical temperature, the first particles may close the pores 10a of the separator main body 10, while the second particles may maintain the shape of the separator 100. For example, the first melting point of the first particles may be 80° C. to 260° C. (more particularly, 80° C. to 200° C.), and the second melting point of the second particles may be 400° C. or higher (more particularly, 500° C. to 600° C.). These temperature ranges are set in consideration of critical temperature of a secondary battery, temperature thereof when in use, and the like. However, the disclosure is not limited to the above examples and the first and second melting points of the respective first and second particles may vary according to use environments, capacity, critical temperature, use temperature, electrolyte, and the like of a secondary battery.

In addition, interparticle gaps of the first and second particles act as micropores 20a and thus pore sizes 10a and 20a may be uniform. Accordingly, a space for storage of the electrolyte may be increased and the storage may be maintained by the polymer binder. Thus, impregnation properties of the electrolyte are enhanced, which results in enhanced characteristics of the secondary battery. In addition, the coating layers 20 have superior affinity with the electrolyte than the separator main body 10 and thus wettability of the electrolyte is enhanced and, accordingly, capacity of the secondary battery may be increased.

One or more embodiments of the present invention will now be described more fully with reference to the following preparation examples. However, these preparation examples are provided for illustrative purposes only and are not intended to limit the scope of the present invention.

PREPARATION EXAMPLE 1

PVDF-HFP and PMMA-co-PAN as polymer binders were added to acetone as a solvent and dissolved therein by stirring at 60° C. for 3 hours to prepare a solution, and a powder including first and second particles was added to the solution and dispersed and pulverized by ball milling for 10 hours, thereby completing preparation of a coating material. In this regard, the amounts of PVDF-HFP, PMMA-co-PAN, and the powder including first and second particles were 1.7 parts by weight, 0.3 parts by weight, and 18 parts by weight, respectively, based on 100 parts by weight of the solution in which acetone and the polymer binders were mixed. Glass frit, as the powder, included 25 parts by weight of the first particles (first glass frit) having a softening temperature of 160° C. and 75 parts by weight of the second particles (second glass frit) having a softening temperature of 500° C.

A separator main body including polyolefin and having a thickness of approximately 16 μm was prepared. The separator main body was immersed in the prepared coating material by dip coating and dried at 60° C. for 10 minutes, thereby completing formation of a coating layer. In this regard, the coating layer had a thickness of 10 μm.

PREPARATION EXAMPLE 2

A separator for secondary batteries was manufactured in the same manner as in Preparation Example 1, except that a powder including 50 parts by weight of the first particles (first glass frit) and 50 parts by weight of the second particles (second glass frit) was used.

PREPARATION EXAMPLE 3

A separator for secondary batteries was manufactured in the same manner as in Preparation Example 1, except that 50 parts by weight of epoxy particles was used as the first particles and 50 parts by weight of Al2O3 particles was used as the second particles.

COMPARATIVE EXAMPLE 1

A separator for secondary batteries was manufactured in the same manner as in Preparation Example 1, except that a powder including 100% of the second glass frit alone without including the first glass frit was used.

COMPARATIVE EXAMPLE 2

A separator main body was prepared and a coating layer was not formed on the separator main body.

Figure 2:
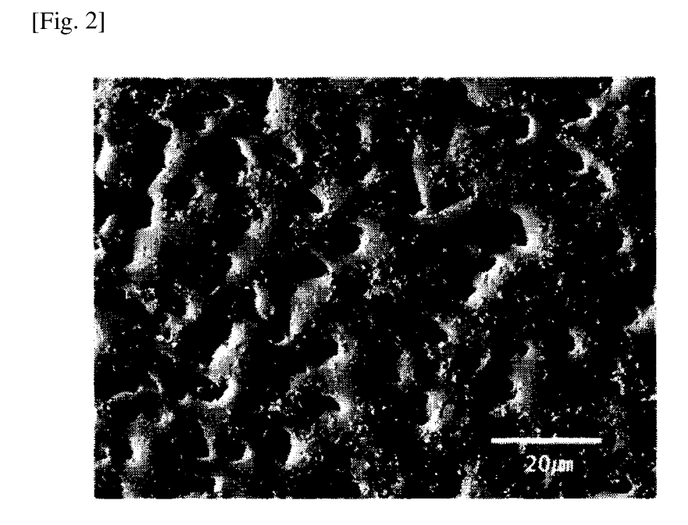
FIG. 2 is a scanning electron microscope (SEM) image of a surface of a separator for secondary batteries manufactured according to Preparation Example 1 after being maintained at 160° C. for 1 hour.
Figure 3:
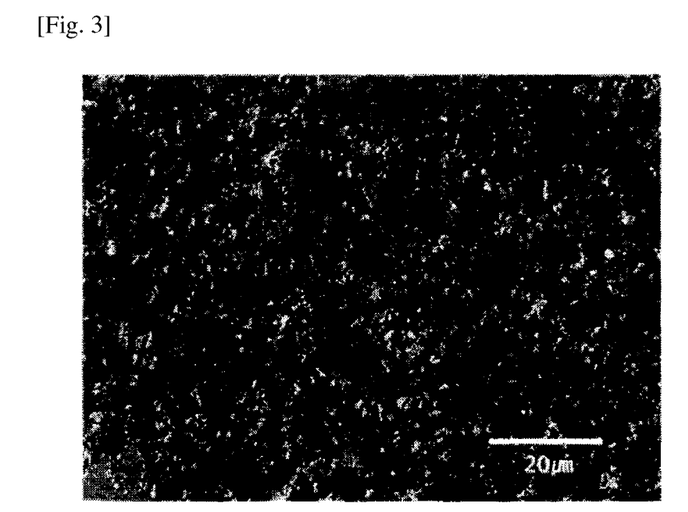
FIG. 3 is an SEM image of a surface of a separator for secondary batteries manufactured according to Preparation Example 2 after being maintained at 160° C. for 1 hour.
Figure 4A:
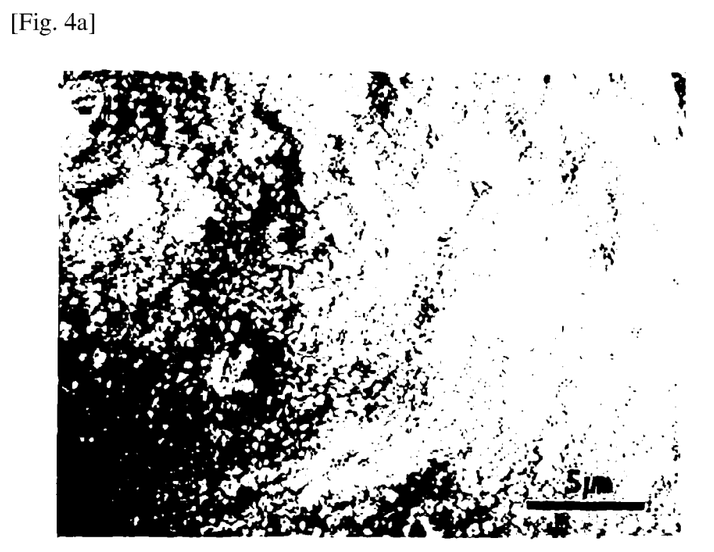
FIG. 4(a) is an SEM image of a surface of a separator for secondary batteries manufactured according to Preparation Example 3.
Figure 4B:
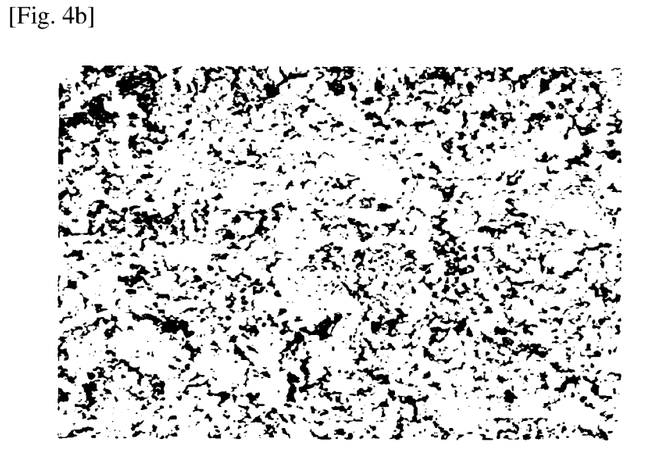
FIG. 4(b) is an SEM image of a surface of the separator of Preparation Example 3 after being maintained at 150° C. for 5 minutes.
Figure 5:
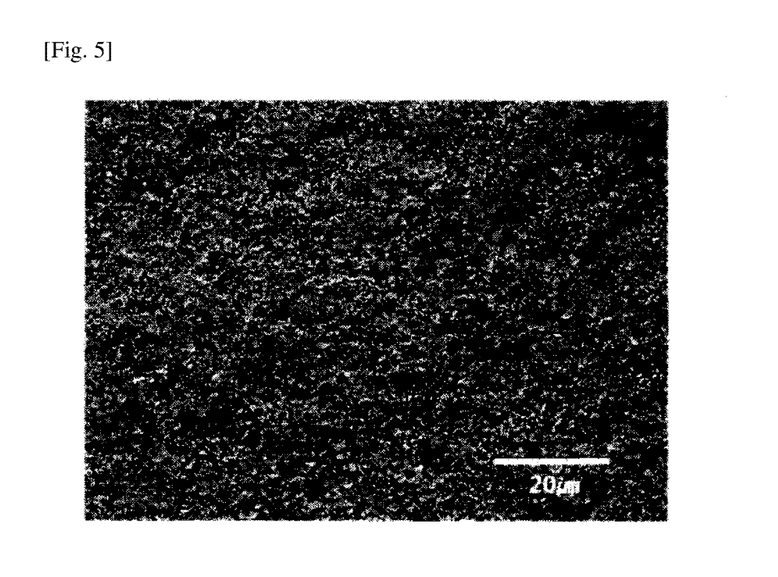
FIG. 5 is an SEM image of a surface of a separator for secondary batteries manufactured according to Comparative Example 1 after being maintained at 160° C. for 1 hour.

A scanning electron microscope (SEM) image of a surface of the separator manufactured according to Preparation Example 1 after being maintained at 160° C. for 1 hour is illustrated in FIG. 2, an SEM image of a surface of the separator manufactured according to Preparation Example 2 after being maintained at 160° C. for 1 hour is illustrated in FIG. 3, an SEM image of a surface of the separator manufactured according to Preparation Example 3 is illustrated in FIG. 4(*a*), and an SEM image of the surface of the separator of Preparation Example 3 after being maintained at 150° C. for 5 minutes is illustrated in FIG. 4(*b*). An SEM image of a surface of the separator manufactured according to Comparative Example 1 after being maintained at 160° C. for 1 hour is illustrated in FIG. 5.

Referring to FIG. 2, it can be confirmed that the separator of Preparation Example 1 has a structure in which the first particles are melted at 160° C. and thus connected in the form of a bridge because the first particles are included in a relatively low amount. Referring to FIG. 3, the separator of Preparation Example 2 has a structure in which the first particles are melted at high temperature and thus cover the entire surface of the separator. Accordingly, effects of closing pores may be further enhanced because the first particles are included in a larger amount than those in Preparation Example 1. As illustrated in FIG. 4(*a*), it can be confirmed that, in the separator of Preparation Example 3, the first and second particles are disposed on the coating layer before melting. In addition, in the separator of Preparation Example 3, as illustrated in FIG. 4(*b*), some particles are observed in a state in which the coating layer entirely covers the separator main body, at a temperature of 150° C. because the first particles formed of powder-type epoxy resin are melted and thus entirely cover the separator main body, and the second particles formed of Al2O3 remain in its form. As such, the separator of Preparation Example 3 may have a structure in which the first particles are melted and thus entirely cover the surface thereof. By contrast, referring to FIG. 5, it can be confirmed that the separator of Comparative Example 1 has irregular pores, and the pores maintained their shapes without being closed even at 160° C.

In addition, as a result of measurement of surface porosities of the separators for secondary batteries after being maintained at the above-described temperature (150° C. or 160° C.), the separator of Preparation Example 1 has a porosity of 22%, and the separators of Preparation Examples 2 and 3 have a porosity of 1% or less. From the results, it can be confirmed that the separator of Preparation Example 1 has some pores, and the separators of Preparation Examples 2 and 3 have entirely closed pores.

Figure 6:
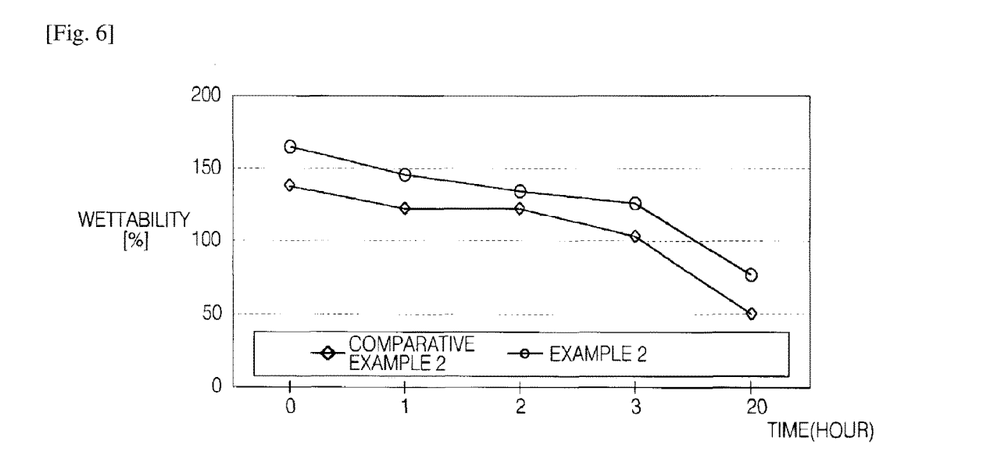
FIG. 6 is a graph showing measurement results of wettability of each of the separators of Preparation Example 2 and Comparative Example 2.

In addition, wettability of each of the separators of Preparation Example 2 and Comparative Example 2 was measured and results are illustrated in FIG. 6. That is, changes in wettability over time after adding an electrolyte are illustrated in FIG. 6.

Referring to FIG. 6, it can be confirmed that the separator of Preparation Example 2 has a wettability of 176%, while the separator of Comparative Example 2 has a wettability of 138%. That is, it can be confirmed that the separator of Preparation Example 2 has a higher wettability than that of Comparative Example 2 due to formation of the coating layer because, in the separator of Preparation Example 2, a storage space for the electrolyte is increased due to formation of interparticle gaps of the first and second particles and the storage is maintained by the polymer binders, and the first and second particles have high affinity with the electrolyte.

In addition, air permeability and thermal contraction at 130° C. and 150° C. of each of the separators of Preparation Examples 1 to 3 and Comparative Examples 1 and 2 were measured and results are shown in Table 1 below. The thermal contraction results are obtained by measuring a thermal contraction rate of each separator after being maintained at 130° C. for 1 hour and after being maintained at 150° C. for 30 minutes.

TABLE 1

|  | Preparation Example 1 | Preparation Example 2 | Preparation Example 3 | Comparative Example 1 | Comparative Example 2 |
| --- | --- | --- | --- | --- | --- |
| Air permeability [sec/100 cc] | 589 | 590 | 611 | 607 | 240 |
| 130° C., 1 hour, thermal contraction rate [%] | 15 | 15 | 15 | 14 | 44 |
| 150° C., 30 min., thermal contraction rate [%] | 20 | 20 | 18 | 20 | 96 |

Referring to Table 1, it can be confirmed that thermal contraction rates of the separators of Preparation Examples 1 to 3 are much higher than that of the separator of Comparative Example 2.

Figure 7:
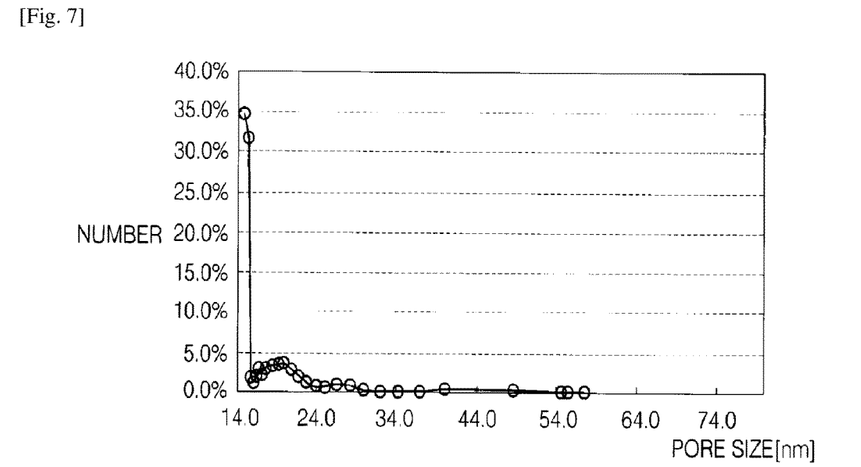
FIG. 7 is a graph showing measurement results of pore size and pore size distribution of the separator of Preparation Example 2.
Figure 8:
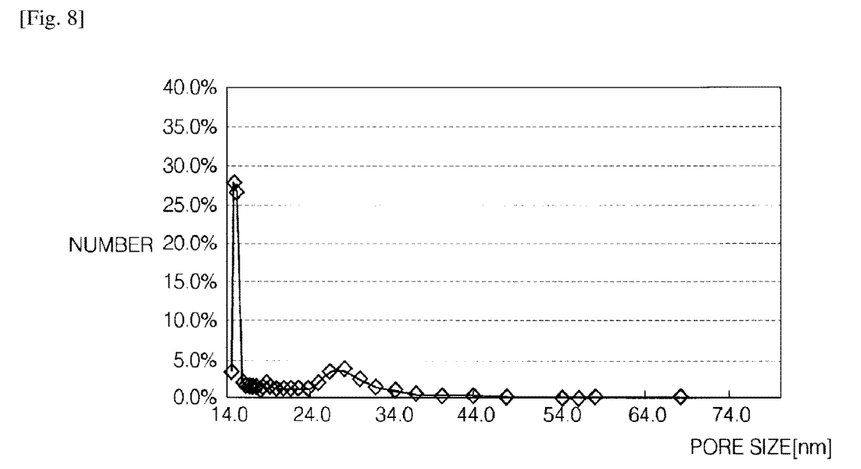
FIG. 8 is a graph showing measurement results of pore size and pore size distribution of the separator of Comparative Example 2.

In addition, pore size and pore size distribution of each of the separators of Preparation Example 2 and Comparative Example 2 were measured and results are shown in FIGS. 7 and 8.

Referring to FIG. 7, the separator of Preparation Example 2 has an average pore size of 16.3 mm and a maximum pore size of 59.5 nm. By contrast, referring to FIG. 8, the separator of Comparative Example 2 has an average pore size of 20.0 nm and a maximum pore size of 68.2 nm.

That is, it can be confirmed that the separator of Preparation Example 2 has a small pore size and more uniform pores. From the result, it can be confirmed that inter-particle gaps of the first and second particles of the coating layer act as micropores and thus the separator of Preparation Example 2 exhibits higher pore uniformity than that of the separator of Comparative Example 2.

Particular characteristics, structures, or effects described in connection with the embodiment are included in at least one embodiment of the present disclosure and not necessarily in all embodiments. Furthermore, the particular characteristics, structures, or effects of any specific embodiment of the present disclosure may be combined in any suitable manner with one or more other embodiments or may be changed by those skilled in the art to which the embodiments pertain. Therefore, it is to be understood that contents associated with such combination or change fall within the spirit and scope of the present disclosure.

Although embodiments have been described with reference to a number of illustrative embodiments, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

The invention claimed is:

1. A separator for secondary batteries, comprising:
   a separator main body; and
   a coating layer disposed on the separator main body and comprising a first particle having a first melting point and a second particle having a second melting point, the second melting point being higher than the first melting point,
   wherein the first particle comprises a first glass frit, and the second particle comprises a second glass frit, and
   wherein the first glass frit comprises a larger amount of a network modifier than the second glass frit.

2. The separator according to claim 1, wherein the first melting point of the first particle is 80° C. to 260° C., and the second melting point of the second particle is 400° C. or greater.

3. The separator according to claim 2, wherein the first melting point of the first particle is 80° C. to 200° C., and the second melting point of the second particle is 500° C. to 600° C.

4. The separator according to claim 1, wherein the first glass frit comprises 35 to 50 parts by weight of the network modifier based on 100 parts by weight of the first glass frit.

5. The separator according to claim 1, wherein the second glass frit comprises 20 parts by weight or less of the network modifier based on 100 parts by weight of the second glass frit.

6. The separator according to claim 1, wherein the network modifier comprises an oxide comprising at least one of sodium (Na), calcium (Ca), barium (Ba), vanadium (V), bismuth (Bi), and lead (Pb).

7. The separator according to claim 1, wherein, when a total amount of the first and second particles is 100 parts by weight, amounts of the first and second particles are 10 to 50 parts by weight and 50 to 90 parts by weight, respectively.

8. The separator according to claim 1, wherein the first particles or the second particles have a median particle size of 0.5 μm to 1.5 μm.

9. The separator according to claim 1, wherein a pore formed in the separator has a size of 10 nm to 1000 nm.

10. The separator according to claim 1, wherein the coating layer has a thickness of 1 μm to 100 μm.

11. The separator according to claim 10, wherein the coating layer has a thickness of 5 μm to 10 μm.

12. The separator according to claim 1, wherein the coating layer further comprises a polymer binder.

13. A method of manufacturing a separator for secondary batteries, the method comprising:
   preparing a separator main body;
   forming a coating material by mixing a solvent, a polymer binder, a first particle having a first melting point, and a second particle having a second melting point, the second melting point being higher than the first melting point; and
   forming a coating layer by coating the coating material on the separator main body and heat-treating the coated separator,
   wherein the first particle comprises a first glass frit, and the second particle comprises a second glass frit, and
   wherein the first glass frit comprises a larger amount of a network modifier than the second glass frit.

14. The method according to claim 13, wherein the forming of the coating material is performed through physical mixing.

15. The method according to claim 13, wherein an amount of the solvent is 50 to 90 parts by weight, an amount of the polymer binder is 1 to 25 parts by weight, an amount of the first particle is 5 to 20 parts by weight, and an amount of the second particle is 5 to 20 parts by weight, based on 100 parts by weight of the coating material.

* * * * *